United States Patent
Walz et al.

(10) Patent No.: US 9,346,006 B2
(45) Date of Patent: May 24, 2016

(54) FILTER DEVICE

(75) Inventors: Michael Walz, Filderstadt (DE);
Tilmann Waechter, Stuttgart (DE)

(73) Assignee: Mahle International GmbH (DE)

( * ) Notice: Subject to any disclaimer, the term of this patent is extended or adjusted under 35 U.S.C. 154(b) by 259 days.

(21) Appl. No.: 13/985,238

(22) PCT Filed: Feb. 3, 2012

(86) PCT No.: PCT/EP2012/051831
§ 371 (c)(1),
(2), (4) Date: Nov. 27, 2013

(87) PCT Pub. No.: WO2012/110327
PCT Pub. Date: Aug. 23, 2012

(65) Prior Publication Data
US 2014/0083298 A1    Mar. 27, 2014

(30) Foreign Application Priority Data
Feb. 14, 2011 (DE) .......................... 10 2011 004 081

(51) Int. Cl.
*B01D 53/04* (2006.01)
*F02M 25/08* (2006.01)
*B60K 15/035* (2006.01)
*B60K 15/03* (2006.01)

(52) U.S. Cl.
CPC ...... *B01D 53/0407* (2013.01); *B60K 15/03504* (2013.01); *F02M 25/0854* (2013.01); *B60K 2015/03236* (2013.01); *B60K 2015/03514* (2013.01)

(58) Field of Classification Search
CPC .............. B01D 53/04; B01D 53/0407; B01D 2257/702; B60K 15/03504; B60K 2015/03236; B60K 2015/03514
USPC ................. 96/131, 132, 147; 95/146; 123/519
See application file for complete search history.

(56) References Cited

U.S. PATENT DOCUMENTS

| 4,386,947 | A  | * | 6/1983  | Mizuno ................. B01D 53/02 |
|           |    |   |         | 123/519                             |
| 5,564,398 | A  | * | 10/1996 | Maeda et al. ................. 123/520 |
| 6,390,073 | B1 |   | 5/2002  | Meiller et al.                       |
| 6,695,896 | B2 | * | 2/2004  | Hara et al. ....................... 96/121 |
| 6,896,852 | B1 | * | 5/2005  | Meiller et al. ................. 422/180 |
| 7,213,582 | B2 |   | 5/2007  | Treudt et al.                        |
| 7,614,387 | B2 | * | 11/2009 | Wang et al. ................... 123/519 |
| 7,789,075 | B2 | * | 9/2010  | Makino ......................... 123/519 |

(Continued)

FOREIGN PATENT DOCUMENTS

| DE | 10150062 A1    |   | 2/2003  |
| DE | 102007056667 A1 |   | 5/2009  |
| EP | 1674318 A1     |   | 6/2006  |
| JP | 2009-250059 A  | * | 10/2009 |

OTHER PUBLICATIONS

Machine-generated English translation of JP 2009-250059 A, published Oct. 2009.*

(Continued)

*Primary Examiner* — Frank Lawrence
(74) *Attorney, Agent, or Firm* — Fishman Stewart PLLC

(57) ABSTRACT

A filter device for venting a fuel tank on a motor vehicle may include a filter module attached to the filter device. The filter module may have a module housing having at least two series-connected filter chambers.

18 Claims, 2 Drawing Sheets

(56) References Cited

U.S. PATENT DOCUMENTS

| | | |
|---|---|---|
| 2004/0173190 A1 | 9/2004 | Makino |
| 2005/0081717 A1* | 4/2005 | Meiller .................. B01D 53/02 96/154 |
| 2006/0191578 A1* | 8/2006 | Treudt et al. .................. 137/587 |
| 2010/0095938 A1* | 4/2010 | Kosugi et al. ................. 123/519 |

OTHER PUBLICATIONS

English abstract for DE-102007056667.
International Search Report for PCT/EP2012/051831.

\* cited by examiner

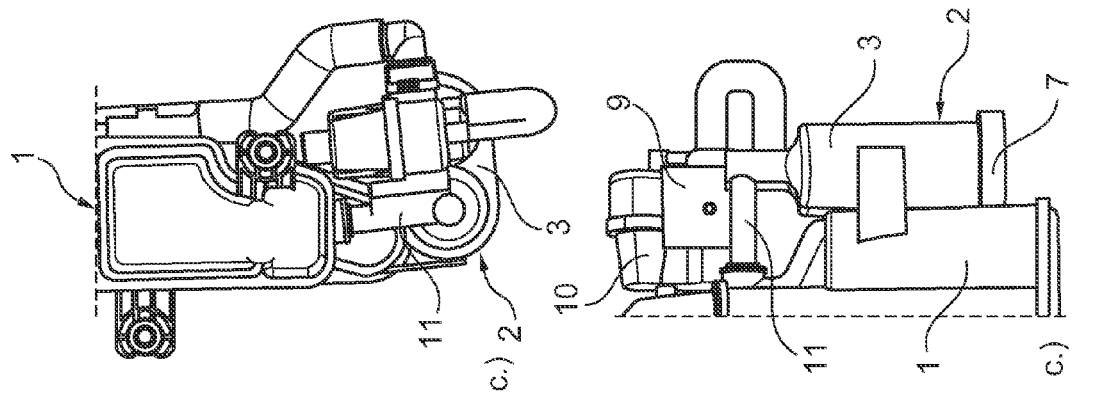
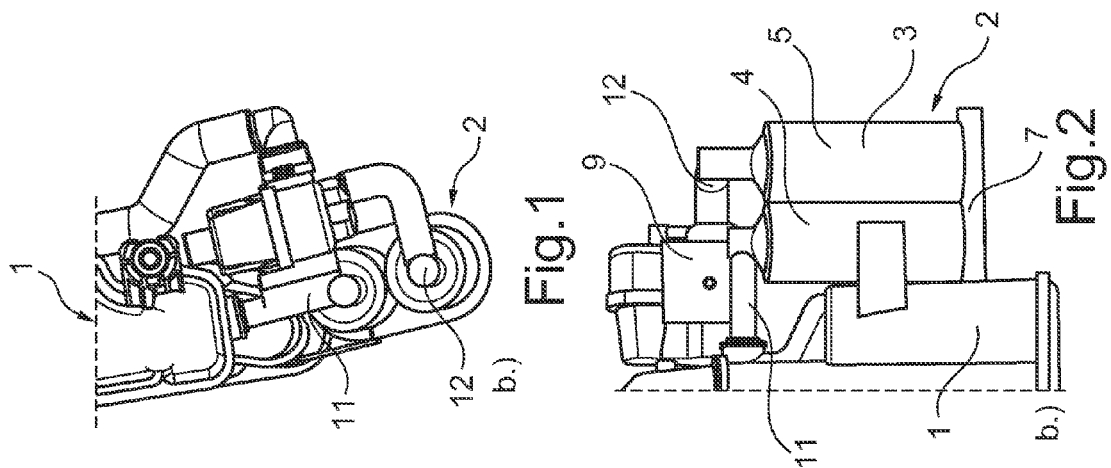
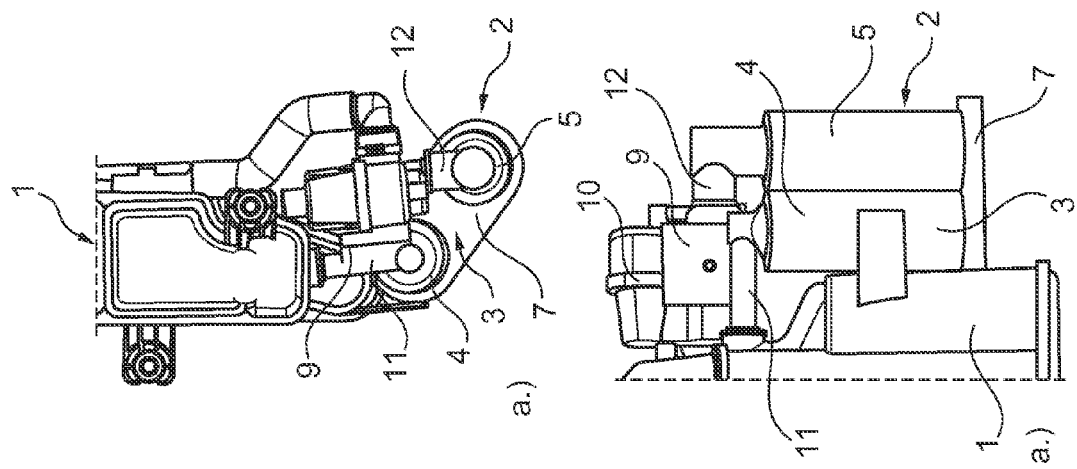

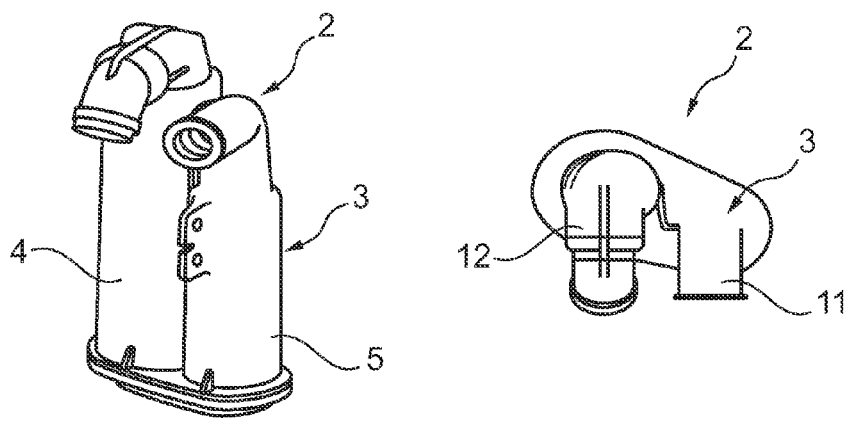
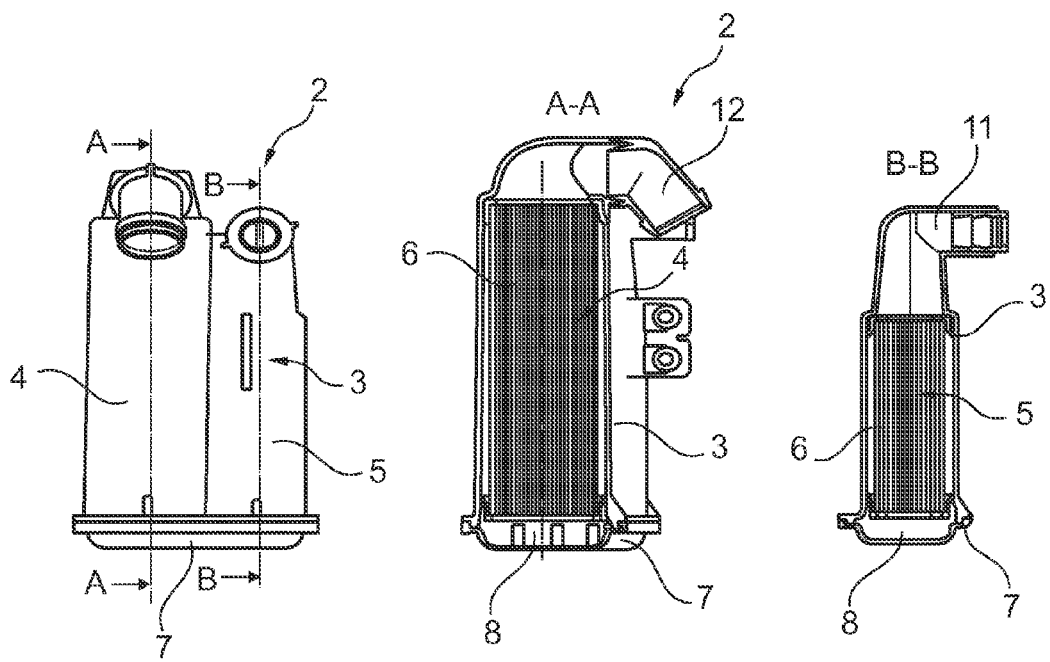
Fig. 3
Fig. 4  Fig. 5

FILTER DEVICE

CROSS-REFERENCE TO RELATED APPLICATIONS

This application claims priority to German Patent Application 10 2011 004 081.1 filed Feb. 14, 2011, and International Patent Application PCT/EP2012/051831 filed on Feb. 3, 2012, both of which are hereby incorporated by reference in their entirety.

TECHNICAL FIELD

The present invention relates to a filter device for venting a fuel tank on a motor vehicle according to the preamble of claim 1. The invention also relates to a filter module for such a filter device.

BACKGROUND

To meet increasingly strict environmental constraints, filter devices are provided on modern motor vehicles for tank venting, as a result of which undesirable escape of hydrocarbons into the environment should be prevented or at least reduced. In the USA in particular, the legal provisions for the total emission behaviour of a motor vehicle are increasingly causing difficulties, so special solution must be provided in particular for the American market.

SUMMARY

The present invention is concerned with the problem of specifying an improved or at least an alternative embodiment for a filter device of the generic type, with which particularly strict environmental constraints can be met.

This problem is solved according to the invention by the subject matter of the independent claims. Advantageous embodiments form the subject matter of the dependent claims.

The present invention is based on the general concept of providing a filter device known per se for venting a fuel tank on a motor vehicle with an additional filter module, which can be attached to the filter device and has a one-piece or integral filter module housing having at least two series-connected filter chambers. Such an additional filter module that can be attached to the previously known filter device offers a simple possibility of reducing a portion of hydrocarbons emitted undesirably from a fuel tank by a further adsorption medium, such as activated carbon, being arranged in the individual filter chambers of the filter module housing. The filter module should be attached completely optionally to the filter device that is present as standard, especially if stricter environmental constraints must be met. The one-piece or integral filter module housing means that two series-connected filter chambers can be handled easily, the series-connected filter chamber creating a comparatively longer adsorption path, which helps to filter out and bind the highest possible portion of hydrocarbons. The filter chambers of the filter module housing are preferably filled with activated carbon, which is pressed to form a honeycomb structure, as a result of which a large surface area and thereby a large adsorption capacity can be achieved. Of course, more than two series-connected filter chambers are also conceivable.

In an advantageous development of the solution according to the invention, the at least two filter chambers of the additional filter module are cylindrical and arranged parallel to each other. Such a configuration of the individual filter chambers allows the use of standard, honeycomb-shaped activated carbon, so a standard product with a high adsorption capacity can be used for the adsorption medium inside the filter chambers. To allow a flow connection between the two filter chambers and thereby to be able to connect them in series, the at least two filter chambers of the filter module are connected to each other by means of a base plate, this base plate having flow ducts that connect the two filter chambers to each other. The base plate not only serves to accommodate the flow ducts, but also to hold the individual filter chambers, it being possible for the filter module housing to be formed for example from plastic, in particular as a plastic injection-moulded part.

The filter module can expediently be fastened to the filter device by means of a plug-in or clip connection. In order to be able to ensure the most flexible handling possible and thereby to react in an individualised manner to different markets, it should be possible to attach or fasten the filter module to the filter device as simply as possible and in particular without an additional tool. Suitable in this case are the plug-in or clip connections proposed according to the invention, by means of which the additional filter module can be plugged or clipped on and thereby fastened to the filter device simply and quickly. Fastening by means of corresponding connections, such as inlet and outlet pieces, is particularly conceivable.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures,

FIGS. 1a-c schematically show different embodiments of a filter device according to the invention, in each case in a view from above, FIGS. 2a-c each schematically show a side view of the filter device according to the invention in embodiments corresponding to FIG. 1, FIG. 3 schematically shows a detailed diagram of the additional filter module in a side view and a view from above, FIG. 4 schematically shows a front view of the filter module, FIG. 5 schematically shows sections through the filter module according to the invention along the sectional planes A-A and B-B.

DETAILED DESCRIPTION

According to FIGS. 1 and 2, a filter device 1 according to the invention for venting a fuel tank (not shown) on a motor vehicle (not shown) has an additional filter module 2, which can be attached to the filter device and has a one-piece or integral filter module housing 3 having at least two series-connected filter chambers 4 and 5. As can be seen in particular in FIGS. 3 to 5, the filter chamber 4 has a larger volume than the filter chamber 5 of the filter module 2, it also being possible of course for these to be the same size.

In the filter device 1 itself and/or in the individual filter chambers 4, 5 of the filter module 2, activated carbon 6 can be arranged to adsorb hydrocarbons, this activated carbon 6 in the filter chambers 4, 5 having a honeycomb structure and thereby providing a comparatively large surface area and favourable flow conditions.

It can be seen in FIGS. 1 to 4 that the at least two filter chambers 4, 5 of the filter module 2 are cylindrical and arranged parallel to each other. At the bottom these two filter chambers 4, 5 are flow-connected to each other by means of a base plate 7, corresponding flow ducts 8 (cf. FIG. 5) being arranged in the base plate 7.

To be able to effect simple fastening of the filter module 2 to the filter device 1, for example a plug-in or clip connection can be provided, as a result of which the filter device can also be used particularly flexibly, as the additional filter module 2 is merely clipped or plugged on, if this is required for example by national regulations and laws. Of course, another type of connection, for example adhesive bonding, screw-fastening or welding, of the filter module 2 to the filter device 1 is also conceivable. Furthermore, further devices such as a panel 9 for fastening a valve 10 can be arranged on the filter module housing 3.

In addition to the actual filter device 1 having the filter module 2, the invention also relates to the filter module 2, which is shown separately according to FIGS. 3 to 5 and can be produced separately, and can be kept available for example as a spare part, in particular for certain national markets. A particular advantage of the filter module 2 according to the invention is that it has at least two series-connected filter chambers 4, 5, more filter chambers of course also being conceivable, as a result of which a comparatively long adsorption path and thereby a good filter effect can be achieved. Back-flushing of the filter module 2 causes the hydrocarbons accumulated in the activated carbon 6 to be desorbed, so the filter module 2 usually has an unlimited service life. The filter module housing 3 is preferably formed in one piece, in particular integrally, configuration of the filter module housing 3 in plastic, in particular as a plastic injection-moulded part being preferably chosen. The base plate 7 can be connected, in particular adhesively bonded, clipped or welded in a leak-proof manner, to the filter module housing 3, after the honeycomb-shaped activated carbon 6 is introduced into the individual filter chambers 4, 5. Of course, a single-piece configuration of the filter module housing 3 is also conceivable, in this case the activated carbon 6 being encapsulated by the filter module housing 3.

It can be seen in the individual embodiments according to FIGS. 1a to c and 2a to c that the arrangement of the two filter chambers 4, 5 with respect to each other and the orientation of the connections 11 and 12 leading out of them can be selected in an individualised manner, that is, to adapt to individual requirements.

The invention claimed is:

1. A filter assembly for venting a fuel tank on a motor vehicle, comprising:
   a filter device; and
   a filter module attached to the filter device by a clip connection, the filter module having:
   a module housing, wherein the module housing has at least two series-connected filter chambers connected in a lateral direction; and
   a base plate arranged at a bottom of the module housing, the base plate having vertically extending projections running in the lateral direction across a width of a first of the at least two series-connected filter chambers to form a plurality of flow ducts arranged in the base plate in the region of the first of the at least two series-connected filter chambers to connect the filter chambers.

2. The filter assembly according to claim 1, wherein at least one of the filter device and the at least two filter chambers is configured to contain activated carbon.

3. The filter assembly according to claim 2, wherein the at least two filter chambers contain the activated carbon and the activated carbon has a honeycomb structure at least in the filter chambers.

4. The filter assembly according to claim 1, wherein the at least two filter chambers of the filter module are cylindrical and arranged parallel to each other.

5. The filter assembly according to claim 1, wherein the at least two filter chambers of the filter module are flow-connected to each other by the flow ducts.

6. The filter assembly according to claim 1, wherein the filter module is further fastened to the filter device by a plug-in connection.

7. The filter assembly according to claim 1, further comprising a valve fastened to the filter module housing via a panel arranged on an exterior of the filter module housing.

8. The filter assembly according to claim 1, wherein the at least two filter chambers are of identical sizes.

9. The filter assembly according to claim 1, wherein the at least two filter chambers are of different sizes.

10. The filter assembly according to claim 2, wherein the at least two filter chambers of the filter module are cylindrical and arranged parallel to each other.

11. The filter assembly according to claim 10, wherein the filter module is further fastened to the filter device by a plug-in connection.

12. The filter assembly according to claim 11, wherein a panel for fastening a valve is arranged on the filter module housing.

13. The filter assembly according to claim 12, wherein the at least two filter chambers are of identical sizes.

14. The filter assembly according to claim 12, wherein the at least two filter chambers are of different sizes.

15. The filter assembly according to claim 2, wherein a panel for fastening a valve is arranged on the filter module housing.

16. The filter assembly according to claim 3, wherein the at least two filter chambers of the filter module are cylindrical and arranged parallel to each other.

17. The filter assembly according to claim 3, wherein the module housing is an integral module housing.

18. The filter assembly according to claim 3, wherein the module housing forms a single piece.

* * * * *